(12) United States Patent
Eipper et al.

(10) Patent No.: US 6,227,583 B1
(45) Date of Patent: May 8, 2001

(54) AUTOMOTIVE IMPACT ENERGY ABSORPTION DEVICE

(75) Inventors: Konrad Eipper, Rottenburg; Matthias Scheffzük, Tübingen, both of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/589,420

(22) Filed: Jun. 7, 2000

(30) Foreign Application Priority Data

Jun. 19, 1999 (DE) .............................. 199 28 099

(51) Int. Cl.[7] .................................................. B60R 19/34
(52) U.S. Cl. .................... 293/133; 293/134; 293/135; 293/107
(58) Field of Search ................................. 293/133, 134, 293/18, 19, 107, 135, 137

(56) References Cited

U.S. PATENT DOCUMENTS

| | | | |
|---|---|---|---|
| 2,977,146 | * | 3/1961 | Edwards et al. ................... 293/134 |
| 3,711,080 | * | 1/1973 | Kendall ........................ 293/65 R X |
| 3,804,443 | * | 4/1974 | Komatsu .............................. 293/134 |
| 3,871,130 | * | 3/1975 | Miller ................................... 293/1 |
| 3,907,351 | * | 9/1975 | Pozelt et al. ........................ 293/134 |
| 4,624,493 | * | 11/1986 | Hillbrand et al. .............. 293/137 X |
| 5,181,589 | * | 1/1993 | Siegner et al. ................... 293/133 X |
| 5,285,877 | * | 2/1994 | Bonenberger et al. .......... 293/134 X |
| 5,460,421 | * | 10/1995 | Culbertson ........................... 293/133 |
| 5,875,875 | * | 3/1999 | Knotts .............................. 293/133 X |
| 5,884,959 | * | 3/1999 | Hillen ................................... 293/134 |

FOREIGN PATENT DOCUMENTS

| | | |
|---|---|---|
| 1172558 | 1/1965 | (DE) . |
| 4241103A1 | 6/1993 | (DE) . |
| 4134545C2 | 3/1994 | (DE) . |
| 296 06 069 U | 8/1996 | (DE) . |
| 19654559A1 | 7/1998 | (DE) . |
| 0857619A1 | 8/1998 | (EP) . |

\* cited by examiner

*Primary Examiner*—Stephen T. Gordon
*Assistant Examiner*—Lori L. Coletta
(74) *Attorney, Agent, or Firm*—Lawrence J. Shurupoff

(57) ABSTRACT

An extendable element absorbs impact energy from a baffle and is capable of being moved by a trigger connected to a collision monitoring system. The device is moved in the longitudinal direction out of an initial position, in which it is received essentially in a vehicle side member, into a working position and is capable of being detained in this position. At the same time, the extendable element is guided in a cylinder arranged in the vehicle side member. The cylinder is connected to the vehicle side member via a turn-up profile arrangement which is capable of being transferred out of a position of rest into a deformation position.

12 Claims, 2 Drawing Sheets

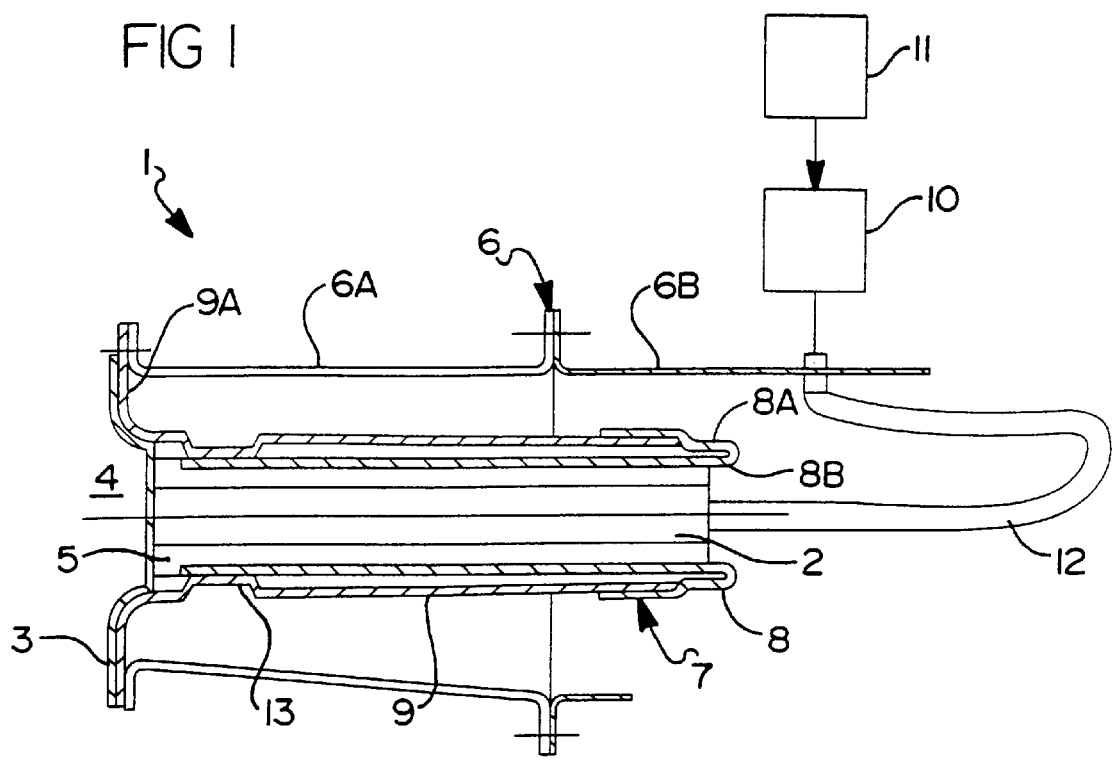
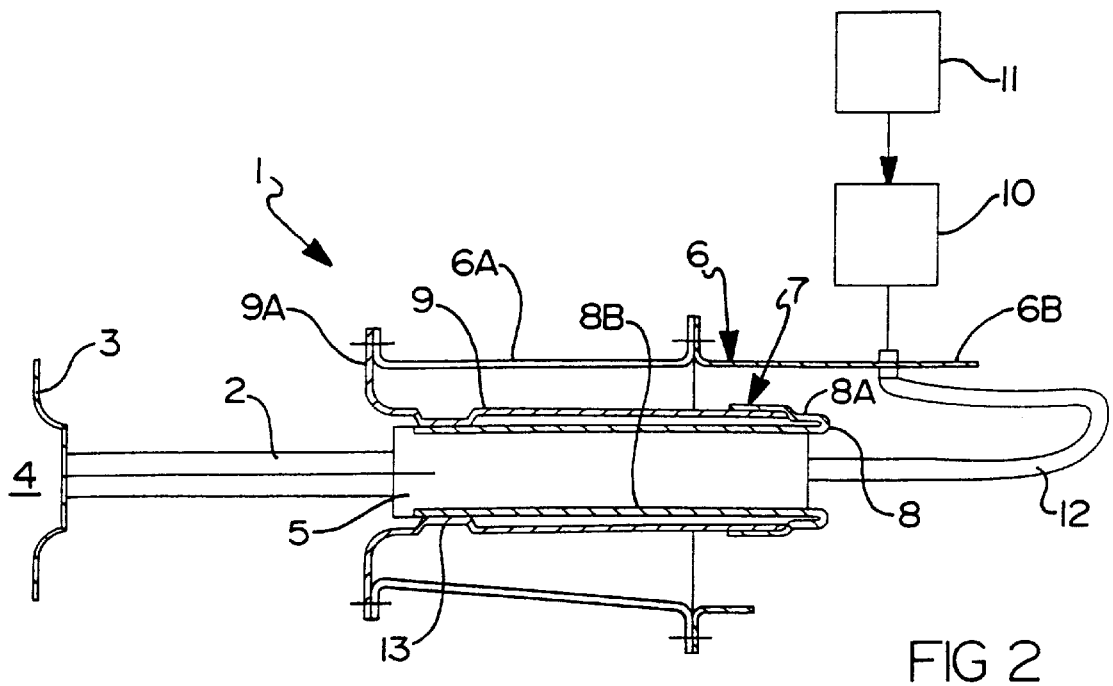

AUTOMOTIVE IMPACT ENERGY ABSORPTION DEVICE

BACKGROUND OF THE INVENTION

Field Of The Invention:

The invention relates to an impact energy absorption device for a motor vehicle wherein a cylinder drives a bumper longitudinally forwardly just prior to collision impact.

Description Of Prior Developments

For absorbing the impact energy in the event of a collision at a low vehicle speed, motor vehicles have fenders or bumper bars with baffle elements which absorb so much impact energy that damage to other components of the vehicle, such as, for example, the lighting system, body and side members, is avoided. The amount of absorbable energy depends on the permissible deformation travel and the resistance force of the fender system. The force level selected for its baffle elements must be so low that the vehicle components carrying the baffle elements are prevented from being compressed in the event of a deformation of the latter.

Since the required deformation travel is required only in the event of a motor vehicle collision and, in the normal driving mode, a corresponding front structure on a motor vehicle constitutes an undesirable lengthening of the latter, it is appropriate to equip a vehicle with extendable baffle elements which, by known sensor technology which detects an obstacle in enough time before the collision, are activated in such a way that they are extended immediately before a collision of the motor vehicle.

DE 196 54 559 discloses an impact absorption device of this type for a motor vehicle, with a component which absorbs impact energy and which is capable of being extended in the longitudinal direction of the motor vehicle out of an initial position, in which it is received essentially in a vehicle side member, into a collision position. When an accident is imminent, the component absorbing impact energy is automatically driven into its collision position in which it projects from the vehicle and in which the full impact energy absorption capacity is available. For this purpose, the component absorbing impact energy is designed with a cylinder arranged in the vehicle side member and with a piston which constitutes a deformable reducing tube and which can be moved into the collision position by means of compressed gas. In the event of a collision, the impact energy is transmitted from a fender or baffle elements to the reducing tube, the latter being pressed through a reducing ring in the longitudinal direction of the side member.

In terms of efficiency, however, this known solution with a reducing ring is not satisfactory in the case of a relatively high collision speed and in view of the high outlay in the manufacture of the reducing ring. Furthermore, the disadvantage of this solution is that, even with the reducing ring pushed in, the cylinder, together with the reducing ring arranged in it, projects beyond the side member in the region of the reducing ring, so that the side member is lengthened by the amount of a fixed block which reduces the free deformation length up to the side member.

EP 0 857 619 A1 discloses a further energy absorption device with an extendable element which is capable of being extended out of a side member and which at its front end has a crossmember as a baffle element which is deformed in the event of a collision. In this solution, too, the impact energy absorption achieved by the deformation of a hollow profile on the extendable element is insufficient, and there is also no guidance for the axial deformation movement, so that the extendable element absorbs force unevenly.

DE 296 06 069 U1 describes a further impact energy absorption device with an impact absorber which is capable of being driven out of a cylinder and which has a telescopic design and is pushed together in the event of a collision.

In addition to these known solutions aimed at offering as long a deformation travel as possible by means of displaceable extendable elements, numerous turn-up tube energy absorption elements are known which operate under the principle of rolling bending and allow high energy absorption with a uniform force level.

DE 42 41 103 discloses such an energy absorption element in the form of an impact damper which has a turn-up tube capable of being overturned outwards, the turn-up tube being supported on a suitable turn-up tool for the purpose of being turned over at the associated end. Furthermore, the turn-up tube encloses a fluid-filled pressure chamber with a throttling outflow.

DE C 11 72 558 describes an impact damping device in which an overturnable sleeve made of deformable metal is arranged between two cylindrical parts of different diameter which are displaceable relative to one another and one within the other, the sleeve being firmly attached with one end-face region to one cylindrical part and with the other end-face region to the other cylindrical part.

DE 41 34 545 C2 discloses a mechanical energy absorption element with two profiles which are displaceable one within the other and to which is fastened a material strip made of flexurally soft and tear-resistant material and deformable during the displacement of the profiles as a result of forces acting on it, the fastening to at least one of the two profiles taking place in a sheet-like manner and the essential contribution to energy absorption being that this sheet-like fastening comes loose successively during the displacement of the profiles.

However, all these known solutions require a front-structure length which is necessary, depending on the desired amount of energy absorption.

A combination of an extendable deformation element and the operative principle of rolling bending is described in DE 198 03 156, in which, in a normal position of rest, a turn-up profile is held in a deformation position, out of which the turn-up profile can be transferred abruptly into an absorption position when a drive device is activated. Under an impact load, the turn-up profile is turned back into its deformation position again. However, along with multiple rolling bending and the additional absorption of impact energy, the material of this known turn-up profile is exposed to very high loads.

SUMMARY OF THE INVENTION

The object of the present invention is to provide an impact energy absorption device for a motor vehicle by means of which as small a front-structure length as possible can be implemented in the state of rest, and by means of which, in the event of a vehicle collision, high energy absorption, with a uniform force level, is to be achieved, while at the same time the formation of a block during deformation is largely avoided.

The impact energy absorption device according to the invention has the advantage that, in the normal driving mode, with the extendable element retracted in the side members, it has a small overall size and is positioned in the vehicle in a visually inconspicuous way. Since the extendable element can be moved abruptly into its working position and can be detained in this position by a trigger, a front structure with a deformation travel for a vehicle collision is nevertheless available in enough time, as required. During the displacement of the structural body, consisting of a cylinder and an extendable element, as a result of an impact load, the turn-up profile arrangement can absorb very high energy by rolling, the components which are displaced axially being guided axially during the deformation. This, in turn, brings about advantageous uniform force absorption.

It is also advantageous, in the impact energy absorption device according to the invention, that, in the case of a corresponding rolling length of the turn-up profile arrangement, the extendable element and the cylinder can be pushed into the side member to an extent such that, in the event of a subsequent deformation of the vehicle side member, these components do not contribute to a formation of a block which would shorten the deformation length of the vehicle side member.

In the impact energy absorption device according to the invention, the efficiency of the impact energy absorption can be set optimally by a variation in the diameters and wall thicknesses of the extendable element, of the cylinder and of the turn-up profile arrangement.

The structural design of the impact energy absorption device according to the invention advantageously proves to be simple, since the cylinder and the extendable element mounted in it can be designed as a hydraulic or pneumatic cylinder/piston unit with known mechanical, electrical or pyrotechnic actuating elements or as a simple spring/cylinder unit which has a spring installed under prestress and capable of being released when a vehicle collision is directly imminent.

BRIEF DESCRIPTION OF THE DRAWINGS

Further advantages and advantageous refinements of the invention may be gathered from the subclaims and from the exemplary embodiment described in principle below with reference to the drawing, in which:

FIG. 1 shows, in a partial longitudinal section, a basic illustration of an impact energy absorption device according to the invention in the position of rest;

FIG. 2 shows a basic illustration of the impact energy absorption device according to FIG. 1, with the extendable element extended, immediately before a vehicle collision;

DETAILED DESCRIPTION OF THE PREFERRED EMBODIMENTS

Figure 3:
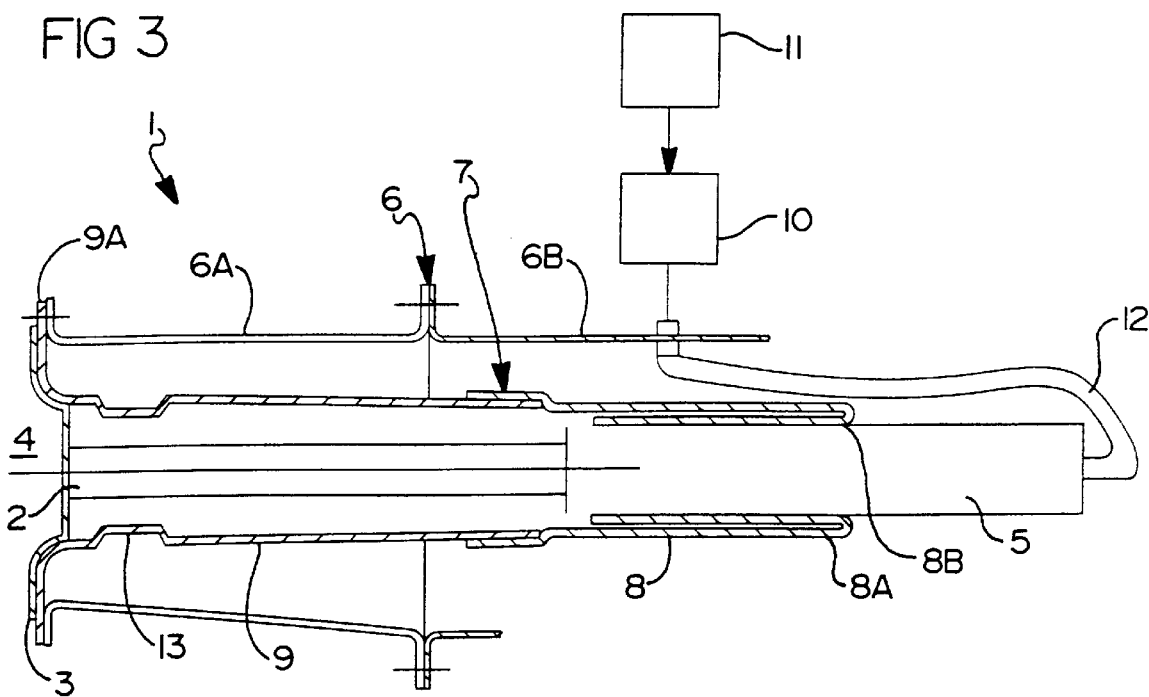
FIG. 3 shows a basic illustration of the impact energy absorption device according to FIG. 1 and FIG. 2 after deformation of a turn-up profile arrangement as a result of a vehicle collision.

FIGS. 1 to 4 diagrammatically illustrate an impact energy absorption device 1 which is provided for impact damping on a front or rear region of a motor vehicle. The impact energy absorption device 1 has a piston-like extendable element 2 which is connected at one end, via a bending-member connection 3, to a baffle element 4 which in the present case is a conventional fender. At its opposite end, the extendable element 2 is mounted in a sealed-off cylinder 5 which is capable of being loaded with pressure oil and which is of tubular design and is arranged in a vehicle side member 6. The cylinder 5 is connected to the vehicle side member 6 via a turn-up profile arrangement 7 which is composed of a turn-up profile 8 and of a tubular casing profile 9.

The impact energy absorption device 1 is, in this case, provided in such a way that the extendable element 2, which, in the normal driving mode, is received in the vehicle side member 6 in an initial position shown in FIG. 1, is capable of being moved, by a trigger means 10 connected to a collision monitoring means 11 of the motor vehicle, in the longitudinal direction of the motor vehicle into a working position illustrated in FIG. 2 and is capable of being detained in this position, so that impact energy can be absorbed by the baffle element 4.

As shown in FIG. 1, with the impact energy absorption device 1 retracted, the extendable element 2 is pushed into the cylinder 5 connected to a supply line 12 for a pressure medium, to such an extent that the entire arrangement consisting of the cylinder 5, extendable element 2, turn-up profile 8 and casing profile 9 is received in the vehicle side member 6, the bending-member connection 3 of the baffle element 4 bearing positively against a flange 9A of the casing profile 9, the flange 9A being flush with the end of the vehicle side member.

The casing profile 9 is screwed with its flange 9A to the vehicle side member 6, in the present exemplary embodiment the vehicle side member 6 being designed, at its end region facing the baffle element 4, with a separate crash element 6A. The casing profile 9 is fixedly connected, at its outside diameter, to an outer region 8A of the turn-up profile 8, the outer region 8A of the turn-up profile 8 being connected via a concertina-like transition to an inner region 8B of the turn-up profile 8. The concertina-like transition is subjected in a known way to a rolling bending operation on the turn-up principle, as soon as a compressive or tensile load is exerted on the turn-up profile 8 coaxially to the longitudinal mid-axis of the turn-up profile 8. As a result of this deformation work, impact energy can be absorbed during such a movement of the turn-up profile 8.

So that the energy absorption capacity of the turn-up profile 8 can be utilized, the inner region 8B of the turn-up profile is fastened to the outside diameter of the cylinder 5 which, guided axially by a guide means 13 formed as an indentation in the casing profile 9, is arranged in the casing profile 9.

FIG. 2 shows the state of the impact energy absorption device 1 immediately before a vehicle collision detected by the collision monitoring means 11, the trigger means 10 moving the extendable element 2 abruptly into its working position by loading the latter with pressure oil, so that, at the very moment of the vehicle collision, the impact energy absorption device 1 makes an increased deformation length available.

Compressed gas can be provided as the pressure medium for loading the extendable element 2 with pressure. The gas can be shot pyrotechnically into the cylinder 5 by the trigger means 10. Also, a compression spring 15 can be installed under pressure and arranged into cylinder 5 for extending the extendable element 2 into its extending position. The compression spring is capable of being released by the trigger when an imminent vehicle collision is detected.

During a subsequent vehicle collision, the extendable element 2, detained in the extended state in the conventional way, is pressed, together with the cylinder 5, into the vehicle side member 6, and, as a result of the rolling bending of the turn-up profile 8, the cylinder 5 is displaced out of its position of rest shown in FIGS. 1 and 2 into a deformation position, in which it is arranged so as to be pushed out of the casing profile 9. During the displacement, deformation work is performed in the region of the concertina-like turn-up of the turn-up profile 8.

FIG. 3 shows the state of the impact energy absorption device 1 after the maximum deformation work of the turn-up profile 8, the bending-member connection 3 of the baffle element 4 impinging onto the side member 6 and onto the flange 9A of the casing profile 9.

Figure 4:
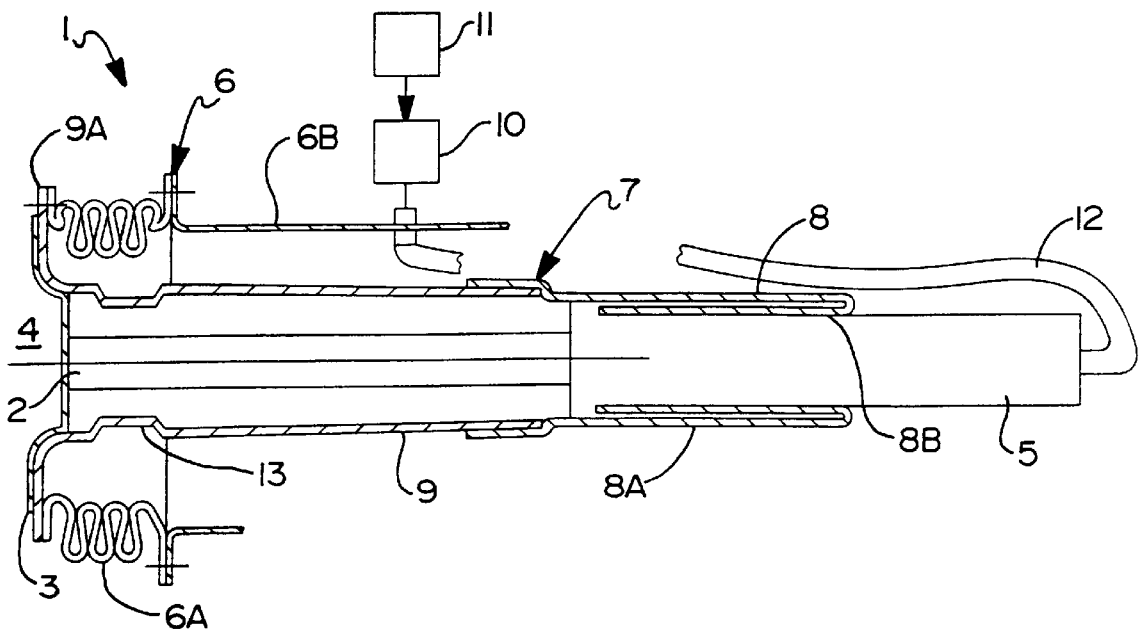
FIG. 4 shows a basic illustration of the impact energy absorption device according to FIG. 1 to FIG. 3 after the deformation of the turn-up profile arrangement and subsequent deformation of a crash element.

As illustrated in FIG. 4, if a crash element 6A is present, further deformation work in the event of a vehicle collision at relatively high speed is performed by the crash element 6A, so that, even with the extendable element fully displaced into the vehicle side member 6, initially no damage to a main component 6B of the vehicle side member 6 occurs. Since the extendable element 2 together with the cylinder 9 is fully displaceable into the main part 6B of the vehicle side member 6 by means of the turn-up profile 8, during the deformation, shown in FIG. 2, of the crash element 6A designed as a side member, these components also do not constitute a block which obstructs the deformation travel.

It is clear to the person skilled in the art, from the diagrammatic illustration according to FIGS. 1 to 4, that the impact energy absorption device 1 according to the invention does not necessarily have only one individual extendable element cooperating with a turn-up profile, but that a plurality of extendable elements which are arranged in parallel and are activated jointly by a collision monitoring means and which are connected to a common or in each case to a specific baffle element may also be provided.

It is likewise self-evident that the vehicle side member 6 may have, instead of the single crash element described, a plurality of crash elements of this type in an axial arrangement.

What is claimed is:

1. An impact energy absorbing device for a motor vehicle having a side member comprising:

a collision monitor;

a trigger actuated by said monitor;

a pressure cylinder connected to said side member and actuated by said trigger;

an extendable element guided in said pressure cylinder along the longitudinal direction of said motor vehicle between a rest position and an extended position;

a baffle element for transferring impact energy to said extendable element; and a turn-up profile arrangement connecting said pressure cylinder to said side member such that impact energy absorbed by said extendable element in said extended position transfers said turn-up profile arrangement into a deformation position.

2. The device according to claim 1, wherein the turn-up profile arrangement has at least one turn-up profile which is designed with an inner region and an outer region, one of the regions being displaceable by deformation relative to the other region and said one region being connected to the cylinder and the other region being supported by the vehicle side member.

3. The device according to claim 2, further comprising a casing profile and wherein the turn-up profile is connected to the vehicle side member via said casing profile arranged in the latter, the cylinder being arranged essentially in the casing profile in a position of rest and being arranged so as to be pushed out of the casing profile in a deformation position.

4. The device according to claim 3, wherein the turn-up profile is fastened with its inner region to an outside diameter of the cylinder and with its outer region to an outside portion of the casing profile.

5. The device according to claim 3, further comprising a guide means fastened to the turn-up profile for guiding the cylinder, wherein said guide means is provided in the casing profile.

6. The device according to claim 5, wherein the guide means is designed as a indentation in the casing profile, said indentation being formed at least over part of the circumference of said casing profile.

7. The device according to claim 1, wherein the cylinder is provided with a supply line for a pressure medium and the extendable element is of piston-like design, and wherein the trigger loads the extendable element with pressure when an imminent vehicle collision is detected.

8. The device according to claim 7, wherein oil is provided as the pressure medium for loading the extendable element with pressure.

9. The device according to claim 7, wherein compressed gas is provided as the pressure medium for loading the extendable element with pressure, said compressed gas being capable of being shot pyrotechnically into the cylinder by the trigger.

10. The device according to claim 1, further comprising a compression spring installed under prestress and arranged in the cylinder.

11. The device according to claim 1, wherein the vehicle side member is designed, at its end region facing the baffle element, with a crash element, the turn-up profile arrangement being fastened to the crash element.

12. The device according to claim 11, wherein, in the deformation position, the cylinder and at least part of the extendable element are displaced into a region of the vehicle side member which is adjacent to the crash element.

* * * * *